(12) United States Patent
Ferreiro et al.

(10) Patent No.: US 8,147,897 B2
(45) Date of Patent: Apr. 3, 2012

(54) CROSS-LINKABLE POLYIONIC COATINGS FOR MEDICAL DEVICES

(75) Inventors: Maria Gonzalez Ferreiro, Berlin (DE); Lutz Kröhne, Berlin (DE); Achim Müller, Aschaffenburg (DE); Katharina Schmid, Aschaffenburg (DE); Andreas Voigt, Berlin (DE)

(73) Assignee: Novartis AG, Basel (CH)

( * ) Notice: Subject to any disclaimer, the term of this patent is extended or adjusted under 35 U.S.C. 154(b) by 1093 days.

(21) Appl. No.: 12/012,870

(22) Filed: Feb. 6, 2008

(65) Prior Publication Data
US 2008/0226922 A1    Sep. 18, 2008

(30) Foreign Application Priority Data

Feb. 9, 2007   (EP) ................................. 07102104

(51) Int. Cl.
*A61L 33/00*    (2006.01)
*B05D 5/06*    (2006.01)
*G02B 1/04*    (2006.01)
*A61K 9/00*    (2006.01)

(52) U.S. Cl. ......... 427/2.1; 427/162; 427/164; 523/106; 424/429

(58) Field of Classification Search .......... 427/162, 427/164, 2.1; 428/413; 424/429; 523/106
See application file for complete search history.

(56) References Cited

U.S. PATENT DOCUMENTS

| 5,434,222 A * | 7/1995 | Reiners et al. ........... 525/432 |
| 6,184,266 B1 * | 2/2001 | Ronan et al. ............. 523/113 |
| 2002/0102480 A1 | 8/2002 | Washizu et al. ........... 430/7 |
| 2003/0175325 A1 | 9/2003 | Chatelier et al. ......... 424/429 |

FOREIGN PATENT DOCUMENTS

| WO | WO 99/35520 | 7/1999 |
| WO | WO 2004/025332 | 3/2004 |

OTHER PUBLICATIONS

European Search Report, Jul. 30, 2007.
PCT International Search Report, Apr. 23, 2008.
PCT Written Opinion of the International Searching Authority, Apr. 23, 2008.

\* cited by examiner

*Primary Examiner* — Dah-Wei Yuan
*Assistant Examiner* — Nga Leung V Law
(74) *Attorney, Agent, or Firm* — Sheng-Hsin Hu; Jian Zhou

(57) ABSTRACT

A method for making an article comprising a core material and a coating thereon, the method comprising the steps of:
(a) providing the core material;
(b) applying one or more layers of a crosslinkable polycationic material, wherein the polycationic material is a reaction product of:
(i) an epoxide of formula (I)

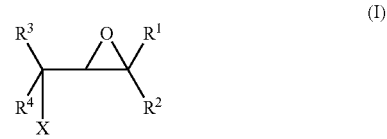

wherein X equals bromo, chloro, iodo, or cyano, and $R^1$, $R^2$, $R^3$, $R^4$, independently of one another, are selected from the group consisting of hydrogen, linear or branched $C_1$-$C_6$-alkyl, and linear or branched $C_1$-$C_6$-alkyl which is substituted with halogen, and
(ii) a polymer having repeating units comprising one or more secondary or tertiary amine group(s);
(c) applying one or more layers of a polyanionic material; and
(d) cross-linking the layers of polyelectrolytes formed by steps (b) and (c).

The articles obtainable by the method of the invention have desirable characteristics regarding adherence to the core material, durability, hydrophilicity, and wettability and are thus useful for the manufacture of medical articles such as ophthalmic devices.

10 Claims, No Drawings

CROSS-LINKABLE POLYIONIC COATINGS FOR MEDICAL DEVICES

This application claims benefit under 35 USC §119 of European patent application No. EP 07102104.2 filed Feb. 9, 2007, the contents of which are incorporated herein by reference.

The present invention relates to a method for the manufacture of an article having a crosslinkable polyionic coating comprising a polyanionic material and a polycationic material, wherein the polycationic material is a reaction product of an alpha-halogeno epoxide or an alpha-cyanato epoxide and a polyamine.

The invention further relates to articles obtainable by the method of the invention and to the use of reaction products of an alpha-halogeno epoxide or an alpha-cyanato epoxide with a polyamine for the coating of medical devices.

BACKGROUND OF THE INVENTION

Many devices used in medical applications require that the bulk of the device has one property, while the surface of the device has another property. For example, contact lenses may have high oxygen permeability through the lens to maintain good corneal health. However, materials that exhibit exceptionally high oxygen permeability (e.g. polysiloxanes) are typically hydrophobic and will adhere to the eye. Thus, such type of contact lenses typically have a core or bulk material that is highly oxygen permeable and hydrophobic, and a surface that has been treated or coated to increase hydrophilicity, thereby allowing the lens to freely move on the eye and preventing adherence of excessive amounts of tear lipid and protein.

In order to modify the nature of the surface of a relatively hydrophobic contact lens material, a contact lens may be treated with plasma. For example, a plasma treatment technique is disclosed in PCT Publication No. WO 96/31792. Some plasma treatment processes, however, require a significant monetary investment in certain equipment. Moreover, plasma treatment requires that the lens is dry before exposure to the plasma. Thus, lenses that are wet from prior hydration or extraction processes must be dried, thereby adding costs for obtaining drying equipment, as well as added time in the overall lens production process.

In order to overcome the above-mentioned drawbacks of plasma treatment various layer-by-layer (LbL) polyelectrolyte deposition techniques have been developed for modifying the nature of the surface of relatively hydrophobic contact lens materials, (e.g., PCT Publication Nos. WO 01/57118, WO 99/35520). These layer-by-layer techniques effectively alter the surfaces of various materials, such as contact lenses. One layer-by-layer (LbL) coating technique involves consecutively dipping a substrate into solutions of oppositely charged polymeric materials until a coating of a desired thickness and hydrophilicity is formed. Another technique that results in a layer-by-layer coating while avoiding the time-consuming aspects of sequential dipping, is the single dip process disclosed in WO 01/57118, which applies charged polymeric material onto the substrate with only a single dip.

Thus, a number of methods of altering the surface properties of polymeric biomaterials using layer-by-layer techniques have been developed. Nevertheless, although these techniques provide effective deposition of polyelectrolytes to biomaterials, such as contact lenses, a need for further improvements still remains. For example, it has been observed that delamination may occur in coatings having a large number of polyelectrolyte bilayers.

Thus, a need currently exists for an improved method of coating a core material, such as that of a contact lens, with polyelectrolyte (polyionic) layers. In particular, a need exists for an improved polyelectrolyte deposition technique that provides a polyelectrolyte coating with improved durability, i.e. a polyelectrolyte coating that is robust against autoclaving and/or rubbing.

SUMMARY OF THE INVENTION

The present invention therefore in one aspect relates to a method for making an article comprising a core material and a coating thereon, the method comprising the steps of:
(a) providing the core material;
(b) applying one or more layers of a crosslinkable polycationic material, wherein the polycationic material is a reaction product of:
(i) an epoxide of formula (I)

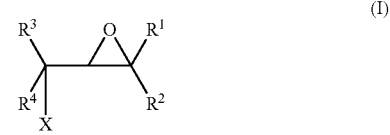

wherein X equals bromo, chloro, iodo, or cyano, and $R^1$, $R^2$, $R^3$, $R^4$, independently of one another, are selected from the group consisting of hydrogen, linear or branched $C_1$-$C_6$-alkyl, and linear or branched $C_1$-$C_6$-alkyl which is substituted with halogen, and
(ii) a polymer having repeating units comprising one or more secondary or tertiary amine group(s);
(c) applying one or more layers of a polyanionic material; and
(d) cross-linking the layers of polyelectrolytes formed by steps (b) and (c).

The invention further relates to an article obtained by the method of the invention.

Finally, the invention is related to the use of the crosslinkable polycationic material for coating a medical device.

DETAILED DESCRIPTION OF PREFERRED EMBODIMENTS

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. As employed throughout the disclosure, the following terms, unless otherwise indicated, shall be understood to have the following meanings.

An "article", as used herein, preferably refers to a medical devices, such as ophthalmic devices, and in particular to contact lenses.

A "medical device", as used herein, refers to a device having surfaces that contact tissue, blood, or other bodily fluids of patients in the course of their operation or utility. Exemplary medical devices include: (1) extracorporeal devices for use in surgery such as blood oxygenators, blood pumps, blood sensors, tubing used to carry blood and the like which contact blood which is then returned to the patient; (2)

prostheses implanted in a human or animal body such as vascular grafts, stents, pacemaker leads, heart valves, and the like that are implanted in blood vessels or in the heart; (3) devices for temporary intravascular use such as catheters, guide wires, and the like which are placed into blood vessels or the heart for purposes of monitoring or repair; and (4) ophthalmic devices. In a preferred embodiment, medical devices are ophthalmic devices.

An "ophthalmic device", as used herein, refers to a contact lens (hard or soft), an intraocular lens, a corneal onlay, other ophthalmic devices (e.g., stents, or the like) used on or about the eye or ocular vicinity, cases or containers for storing ophthalmic devices or ophthalmic solutions.

"Biocompatible", as used herein, refers to the property of a material or the surface of a material, which may be in intimate contact with tissue, blood, or other body fluids of a patient for an extended period of time without significantly damaging the biological environment and without significant user discomfort.

The term "repeating units" is meant as constitutional repeating units as defined in IUPAC Compendium of Chemical Terminology, $2^{nd}$ Edition (1997).

"LbL coating", as used herein, refers to a coating obtained by a layer-by-layer ("LbL") alternative, physical deposition of two oppositely charged polymeric materials or of a charged polymeric material and a non-charged polymeric material on an article. In an LbL coating, each layer of a material is non-covalently bond to another layer of a different material. Any suitable deposition techniques can be used in the LbL coating. Exemplary deposition techniques include, without limitation, dipping a substrate into a coating solution and spraying a substrate with a coating solution.

In general, any solvent that allows the components within the coating solution to remain stable is suitable for use in the present invention.

LbL deposition techniques may include one or several washing steps after the deposition of each polyionic material.

The term "bilayer" is employed herein in a broad sense and is intended to encompass a coating structure formed by alternatively applying, in no particular order, one layer of a first charged polymeric material and one layer of a non-charged polymeric material or a second oppositely charged polymeric material. It should be understood that the layers of the first charged polymeric material and the non-charged polymeric material (or second charged polymeric material) may be intertwined with each other in the bilayer.

An "innermost layer", as used herein, refers to the first layer of an LbL coating, which is applied onto the surface of a medical device.

A "capping layer", as used herein, refers to the last layer of an LbL coating which is applied onto the surface of a medical device.

As used herein, "increased surface hydrophilicity" or "increased hydrophilicity" in reference to a coated ophthalmic device means that the coated ophthalmic device is covered by a uniform fluid film and has a reduced averaged contact angle relative to an uncoated ophthalmic device, wherein both coated and uncoated ophthalmic device are made of the same core material.

A "polyamine" is defined as an organic compound having at least three amino groups.

The polycationic and polyanionic materials of the coatings of the present invention may be deposited onto the surface of the core material in a layer-by-layer manner. Layer-by-layer deposition techniques are known (for example, from PCT Publication Nos. WO 01/57118, WO 99/35520) and may be adapted to the polycationic and polyanionic materials applied in the method of the present invention.

It is preferred to apply, in no particular order, one or more bilayers onto the surface of the core material, i.e. the innermost layer and the capping layer, respectively, may be formed by a polycationic or a polyanionic material.

The polycationic materials of the present invention are reaction products of:
(i) an epoxide of formula (I)

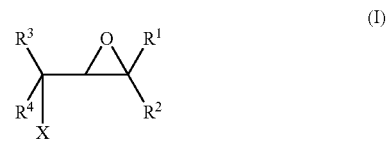

wherein X equals bromo, chloro, iodo, or cyano, and $R^1$, $R^2$, $R^3$, $R^4$, independently of one another, selected from the group consisting of hydrogen, linear or branched $C_1$-$C_6$-alkyl, and linear or branched $C_1$-$C_6$-alkyl which is substituted with halogen, and
(ii) a polymer having repeating units comprising one or more secondary or tertiary amine group(s).

In preferred epoxides of formula (I), X equals chloro or bromo and $R^1$, $R^2$, $R^3$, $R^4$ are, independently of one another, selected from the group consisting of hydrogen, linear or branched $C_1$-$C_4$-alkyl, and linear or branched $C_1$-$C_4$-alkyl which is substituted with halogen.

A particulary preferred epoxide is epichlorohydrin (Formula (I), wherein X equals chloro, and $R^1$, $R^2$, $R^3$, $R^4$ each are hydrogen). Reaction products of epichlorohydrin with a polyamine are known as "polyamine-epichlorohydrins".

Other preferred alpha-halogeno epoxides are, for example, epibromohydrin, epiiodohydrin, alkyl-substituted epibromoehydrins, alkylsubstituted epichlorohydrins, bromoepoxybutane, or chloroepoxybutane.

Reaction products of epoxides of formula (I) with polymers having repeating units comprising secondary amine groups comprise reactive azetidinium and/or epoxy groups. Reactive azetidinium and/or epoxy groups are capable to form covalent bonds with nucleophilic groups. Therefore, reaction products of epoxides of formula (I) with polymers having repeating units comprising secondary amine groups are able to form cross-links with themself, with suitable polyanions of a LbL coating and/or with reactive groups at the surface of a suitable core material. This leads to an internal stabilization of the coating and, if applicable, to a covalent bond between the coating and the core material of the medical device.

Cross-linking of a coating comprising polycationic and polyanionic materials of the invention may take place under appropriate conditions (temperatures, pH values) known to the skilled person in the art depending on the nature of the nucleophile. Preferred temperatures for cross-linking are of from room temperature (18 to 25° C.) to about 140° C. It is particularly preferred to achieve cross-linking during a heat sterilization process (e.g. by autoclaving at 110 to 130° C. for 15 min to about 3 h). Cross-linking yields a stabilized coating.

Preferably, the polymer having repeating units comprising one or more secondary or tertiary amine group(s) comprises such repeating units in an amount of >20% by weight, more preferably >50% by weight, and particularly preferably in an amount >90% by weight, based on the total weight of the polymer.

Preferably, the polymer which forms reaction products with an alpha-halogeno-epoxide of formula (I) comprises secondary amine groups. Particularly preferred are poly(alkylene imines), for example poly(ethylene imine), or a poly(amidoamine), for example, a polycondensate derived from a polyamine and a dicarboxylic acid. Particularly preferred polycondensates are derived from diethylene triamine and adipic acid (adipic acid-diethylenetriamine copolymer).

Reaction products of epichlorohydrin and polymers having repeating units comprising secondary or tertiary amine groups are known. Suitable procedures may be found, for example, in DE Auslegeschrift No. 1 177 824. Polyamines having three or more amino groups are reacted with $C_3$-$C_{10}$-dicarboxylic acids to yield corresponding poly(amidoamines) which are then converted with epichlorohydrin into water-soluble condensation products (polyamidoamine-epichlorohyrins, "PAE").

Examples 18 to 20 of DE Auslegeschrift No. 1 177 824 describe procedures for the preparation of adipic acid-diethylenetriamine copolymer and its further reaction with epichlorohydrin to a mixture of crosslinkable cationic polyamido-epichlorohydrin.

Polyamidoamine-epichlorohyrins and polyamine-epichlorohydrin resins are commercially available, e.g. from Hercules under the trade name Kymene® or Polycup® or from Servo/Delden under the trade name Servamine®.

Polyamidoamine-epichlorohyrin and polyamine-epichlorohydrins have been used as additives in the paper industry (WO 00/09806).

Examples of polyanionic materials suitable for use in step (c) of the invention include, for example, a synthetic polymer, a biopolymer or modified biopolymer comprising nucleophilic groups which can undergo a reaction with epoxides. Examples for nucleophilic groups are, for example, carboxy, hydroxyl, amine or thiol groups, mixtures thereof, and salts thereof.

Examples of synthetic polyanionic polymers are: polyacrylic acid (PAA), polymethacrylic acid (PMA), derivatives and copolymers thereof, for example, copolymerization products of methacrylic acid and methacrylic esters (e.g. Eudragit®), a branched polyacrylic acid, a polyacrylic acid or polymethacrylic acid copolymer, a maleic or fumaric acid copolymer, a poly(styrenesulfonic acid) (PSS), a polyamino acid, a carboxy-terminated polymer of a diamine and a di- or polycarboxylic acid (e.g., carboxy-terminated Starburst™ PAMAM dendrimers from Aldrich), a poly(2-acrylamido-2-methylpropanesulfonic acid) (poly-(AMPS)), an alkylene polyphosphate, an alkylene polyphosphonate, a carbohydrate polyphosphate or carbohydrate polyphosphonate (e.g., a teichoic acid). Examples of a branched polyacrylic acid include a Carbophil® or Carbopol® type from Goodrich Corp. Examples of a copolymer of acrylic or methacrylic acid include a copolymerization product of an acrylic or methacrylic acid with a vinylmonomer including, for example, acrylamide, N,N-dimethyl acrylamide or N-vinylpyrrolidone.

Examples of polyanionic biopolymers or modified biopolymers are: carboxy substituted carbohydrates, for example carboxymethyl cellulose, carboxymethyl dextrans, carboxyalkyl chitins, carboxymethyl chitosans, carboxymethylamylose; hyaluronic acid, glycosaminoglycanes such as heparin or chondroitin sulfate, fucoidan, polyamino acids, for example poly-aspartic acid, poly-glutamic acid, alginates, pectins, gellan, carboxyalkyl chitins, carboxymethyl chitosans, sulfated polysaccharides, glycosaminoglycanes, polylactate and proteins at appropriate pH value.

Preferred polyanionic materials are carboxy substituted carbohydrates, alginates, poly(acrylic acid), poly(methacrylic acid), and mixtures thereof and copolymerization products of methacrylic acid and methacrylic esters.

Particularly preferred polyanionic materials are carboxymethyl cellulose and carboxyethyl cellulose.

The biomedical article according to the invention is, for example, an ophthalmic device, preferably a contact lens including both hard and particularly soft contact lenses, an intraocular lens or an artificial cornea, comprising in each case an organic bulk material. Further examples of suitable biomedical articles are wound healing dressings, eye bandages, materials for the sustained release of an active compound such as a drug delivery patch, moldings that can be used in surgery, such as heart valves, vascular grafts, catheters, artificial organs, encapsulated biologic implants, e.g. pancreatic islets, materials for prostheses such as bone substitutes, or moldings for diagnostics, membranes or biomedical instruments or apparatus.

In a preferred embodiment, the bulk core material comprises nucleophilic groups at the surface capable to form cross-links with the coating. Examples for nucleophilic groups are, for example, carboxy, hydroxyl, amine or thiol groups, mixtures thereof, and salts thereof.

However, the bulk core material underlying the coating of the invention may also be a hydrophobic material that is devoid of ionic groups such as cationic or anionic groups or has at least a relatively low concentration of ionic groups. Accordingly, the surface of the preferred bulk materials may also have a low concentration of ionic groups or is even devoid of ionic groups such as carboxy, sulfo, amino and the like groups and thus may be substantially free of ionic charges.

Examples of suitable bulk materials are natural or synthetic organic polymers or modified biopolymers which are known in large number. Some examples of polymers are polyaddition and polycondensation polymers (polyurethanes, epoxy resins, polyethers, polyesters, polyamides and polyimides); vinyl polymers (polyacrylates, polymethacrylates, polyacrylamides, polymethacrylamides, polystyrene, polyethylene and halogenated derivatives thereof, polyvinyl acetate and polyacrylonitrile); or elastomers (silicones, polybutadiene and polyisoprene).

A preferred group of materials to be coated are those being conventionally used for the manufacture of biomedical devices, e.g. contact lenses, in particular contact lenses for extended wear, which are not hydrophilic per se. Such materials are known to the skilled artisan and may comprise for example polysiloxanes, perfluoroalkyl polyethers, fluorinated poly(meth)acrylates, polyalkyl(meth)acrylates, or fluorinated polyolefines, such as fluorinated ethylene or propylene, for example tetrafluoroethylene, preferably in combination with specific dioxols, such as perfluoro-2,2-dimethyl-1,3-dioxol. Mixtures of two or more of the above-mentioned materials are also possible.

Within the present invention silicon hydrogels, perfluoroalkyl polyethers or mixtures thereof, in particular silicon hydrogels, are the preferred hydrophobic organic bulk materials.

Examples of suitable silicon hydrogels are, for example, those currently used for the manufacture of extended wear contact lenses, for example copolymers of (i) one or more hydrophilic monomers, for example selected from the group of hydroxyethylacrylate, hydroxyethylmethacrylate, acrylamide, N,N-dimethyl acrylamide, N-vinylpyrrolidone, N-vinyloxycarbonyl-L-alanine, acrylic or methacrylic acid; and (ii) a monomer and/or macromonomer comprising a siloxane or silane group, e.g. trimethylsilyl group. Examples of the latter group are tris-trimethylsilyloxy-silyl-propyl methacrylate (TRIS) or tris-trimethylsilyloxy-silyl-propyl vinyl carbamate (TRIS-VC), a polydimethylsiloxane having a C—C double bond at one single terminal, or a polydimethylsiloxane crosslinker having either C—C double bonds at both terminals or two or more pendent C—C double bonds, for example, as described in formula (2) below. Examples of suitable commercially available silicon hydrogels are Balafilcon A, Galyfilcon A, Lotrafilcon A, Lotrafilcon B or Senofilcon A.

Another group of preferred silicon hydrogels are amphiphilic segmented copolymers comprising at least one hydrophobic silicon or perfluoroalkyl polyether segment and at least one hydrophilic segment which are linked through a bond or a bridge member. Examples of said silicon hydrogels are disclosed, for example, in PCT applications WO 96/31792 and WO 97/49740. A particularly preferred amphiphilic segmented copolymer comprises at least one hydrophobic segment selected from the group consisting of a polysiloxane, perfluoroalkyl polyether and a mixed polysiloxane/perfluoroalkyl polyether segment, and at least one hydrophilic segment selected from the group consisting of a polyoxazoline, poly(2-hydroxyethylacrylate), poly(2-hydroxyethylmethacrylate), polyacrylamide, poly(N,N-dimethylacrylamide), polyvinylpyrrolidone and a polyethyleneoxide segment.

Still another group of preferred silicon hydrogels are those obtainable by crosslinking a crosslinkable or polymerizable prepolymer that is obtainable by (a) copolymerizing at least one hydrophilic monomer having one ethylenically unsaturated double bond and at least one silicon crosslinker comprising two or more ethylenically unsaturated double bonds in the presence of a chain transfer agent having a functional group; and (b) reacting one or more functional groups of the resulting copolymer with an organic compound having an ethylenically unsaturated group. Silicon hydrogels of this type are disclosed, for example in WO 01/71392.

A particularly preferred silicon hydrogel is obtained by crosslinking a prepolymer which is obtainable by (a) copolymerizing a hydrophilic monomer of the formula

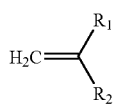

(1)

wherein $R_1$ is hydrogen or methyl, and $R_2$ is –OOO-$(CH_2)_2$— OH, —$CONH_2$, —$CON(CH_3)_2$, —COOH, or

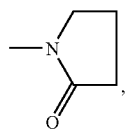

optionally in admixture with one or more further hydrophilic monomers; and a polysiloxane crosslinker corresponds to formula

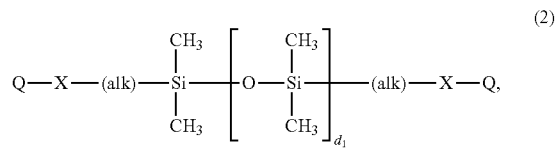

(2)

wherein $d_1$ is an integer from 10 to 500, preferably 10 to 300, more preferably 20 to 200 and in particular 25 to 150, (alk) is linear or branched $C_2$-$C_4$ alkylene or a radical —$(CH_2)_{1-3}$—O—$(CH_2)_{1-3}$—, X is —O— or —NH— and Q is a radical of the formula

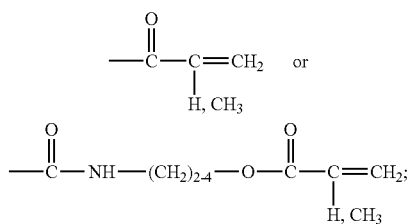

in the presence of a chain transfer agent having a functional group, in particular 2-mercaptoethanol or especially 2-aminoethane thiol (cysteamine); and (b) reacting the resulting copolymer with an organic compound having an ethylenically unsaturated group, for example with 2-isocyanatoethylmethacrylate (IEM), 2-vinylazlactone, 2-vinyl-4,4-dimethyl-azlactone, acryloyl or methacryloyl chloride, 2-hydroxyethylacrylate (HEA), 2-hydroxymethacrylate (HEMA), glycidylacrylate or glycidylmethacrylat, in particular with IEM or acryloyl chloride.

Before application of polyionic materials the core material may be allowed to swell in a solvent solution containing a solvent and/or one or more polyionic component(s). Examples of suitable solvents include, but are not limited to, $C_1$-$C_6$-alcohols, for example, isopropyl alcohol, hexanol, ethanol.

In certain embodiments, the substrate material is first allowed to swell in an aqueous alcohol solution, for example in a solution containing about 30% isopropyl alcohol and about 70% water.

The invention may be better understood by reference to the following example.

Lens Material:

Contact lenses made of Lotrafilcon B have been formed by copolymerization of a mixture comprising a polydimethylsiloxane/perfluoro-polyether macromonomer, a hydrophilic monomer (N,N-dimethylacrylamide) and a silicone-containing monomer (3-tris(trimethyl-siloxy)silylpropyl methacrylate).

The lenses have not been subjected to a surface oxidation treatment.

Suitable procedures for the manufacture of these materials are described, for example, in U.S. Pat. No. 5,760,100.

EXAMPLE

Coating of a Hydrogel Lens with CMC/PAE by LbL Technique

A solution of 0.2% wt. carboxymethyl cellulose (CMC, Mw=90.000) in 0.05 M acetate buffer (pH=6.0) containing 0.15 M NaCl, and a solution of 0.2% PAE (Servamine KZC 20 (Servo/Delden), reaction products of epichlorohydrin with adipic acid-diethylenetriamine copolymer, CAS RN 25212-19-5) in 0.05 M acetate buffer (pH=6.0) containing 0.15 M NaCl are prepared. An uncoated Lotrafilcon B lens is soaked in 30% ethanol aqueous solution for 30 sec. The lens is incubated with CMC solution at rt. for 10 min to form the first layer. After 3 times rinsing with DI-water, the lens is incubated with PAE solution for 10 min and rinsed 3 times with DI-water. The incubations in CMC and PAE solutions are repeated until 8 layers are assembled onto the lens surface. After several washing steps with PBS buffer the lens is autoclaved at 121° C. for 30 min. The lenses coated with this procedure show a very good wettability (the lens surface is covered by a uniform fluid film).

What is claimed is:

1. A method for making a contact lens comprising a core material and a coating thereon, the method comprising the steps of:
   (a) providing the core material;
   (b) applying one or more layers of a crosslinkable polycationic material, wherein the polycationic material is a reaction product of:
   (i) an epoxide of formula (I)

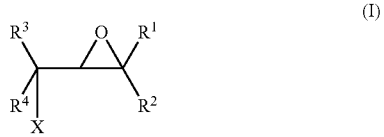

(I)

wherein X equals bromo, chloro, iodo, or cyano, and $R^1$, $R^2$, $R^3$, $R^4$, independently of one another, are selected from the group consisting of hydrogen, linear or branched $C_1$-$C_6$-alkyl, and linear or branched $C_1$-$C_6$-alkyl which is substituted with halogen, and
   (ii) a polymer having repeating units comprising one or more secondary or tertiary amine group(s);
   (c) applying one or more layers of a polyanionic material; and
   (d) cross-linking the layers of polyelectrolytes formed by steps (b) and (c).

2. The method according to claim 1, wherein X equals chloro and $R^1$, $R^2$, $R^3$, $R^4$ are each hydrogen.

3. The method according to claim 1, wherein the repeating units of the polymer comprise one or more secondary amine group(s).

4. The method according to claim 3, wherein the secondary amine groups comprising polymer is selected from the group consisting of a poly(alkylene imine) and a poly(amidoamine).

5. The method according to claim 4, wherein the poly(amidoamine) is a polycondensate derived from a polyamine and a dicarboxylic acid.

6. The method according to claim 5, wherein the polyamine is a diethylene triamine and the dicarboxylic acid is a adipic acid.

7. The method device according to claims 1, wherein the polyanionic material is selected from the group consisting of carboxy substituted carbohydrates, alginates, polyacrylic acid, polymethacrylic acid, and mixtures thereof.

8. The method according to claim 7, wherein the polyanionic material is a carboxymethyl cellulose.

9. The method according to any one of claims 1, wherein the core material is made of a silicone hydrogel.

10. The method according to any one of claims 1, wherein the crosslinking is achieved by a heat sterilization process.

* * * * *